United States Patent
Hamanaga

(10) Patent No.: US 12,481,013 B2
(45) Date of Patent: Nov. 25, 2025

(54) IMAGE PROCESSING APPARATUS FOR CORRECTING DISTORTIONS OF MAGNETIC RESONANCE IMAGES

(71) Applicant: CANON MEDICAL SYSTEMS CORPORATION, Otawara (JP)

(72) Inventor: Shohei Hamanaga, Nasushiobara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 387 days.

(21) Appl. No.: 18/068,684

(22) Filed: Dec. 20, 2022

(65) Prior Publication Data

US 2023/0221393 A1    Jul. 13, 2023

(30) Foreign Application Priority Data

Jan. 13, 2022    (JP) .................. 2022-003906

(51) Int. Cl.
*G01R 33/565* (2006.01)
*G01R 33/24* (2006.01)

(52) U.S. Cl.
CPC ..... *G01R 33/56563* (2013.01); *G01R 33/243* (2013.01)

(58) Field of Classification Search
None
See application file for complete search history.

(56) References Cited

U.S. PATENT DOCUMENTS

2019/0064300 A1* 2/2019 Higaki ............... G01R 33/5608

FOREIGN PATENT DOCUMENTS

JP    2019-50937 A    4/2019

OTHER PUBLICATIONS

S. Skare et al. "Correction of MR Image Distortions Induced by Metallic Objects Using a 3D Cubic B-Spline Basis Set: Application to Stereotactic Surgical Planning" Magnetic Resonance in Medicine 54:169-181 (2005) 14 pages.

Paul S. Morgan, PhD, et al., "Correction of Spatial Distortion in EPI Due to Inhomogeneous Static Magnetic Fields Using the Reversed Gradient Method" Journal of Magnetic Resonance Imaging 19:499-507 (Jun. 26, 1905) 9 pages.

(Continued)

*Primary Examiner* — Lennin R Rodriguezgonzalez
(74) *Attorney, Agent, or Firm* — Oblon, McClelland, Maier & Neustadt, L.L.P.

(57) ABSTRACT

An image processing apparatus according to an embodiment includes processing circuitry. The processing circuitry is configured to obtain two magnetic resonance images corresponding to two phase encoding directions opposite to each other. The processing circuitry is configured to generate a shift map related to shifting a plurality of pixels in the two magnetic resonance images, by optimizing a cost function using a first difference between the two magnetic resonance images and a second difference between two edge images generated on the basis of the two magnetic resonance images. The processing circuitry is configured to generate a correction image obtained by correcting distortions of the two magnetic resonance images on the basis of the two magnetic resonance images and the shift map.

14 Claims, 8 Drawing Sheets

(56) References Cited

OTHER PUBLICATIONS

Hsuan Chang et al. "A technique for accurate magnetic-resonance imaging in the Presence of Field Inhomogeneities" IEEE Transactions On Medical Imaging, vol. 11, No. 3, Sep. 1992 (11 pages).
Jesper L.R. Andersson, et al., "How to correct susceptibility distortions in spin-echo echo-planar images: application to diffusion tensor imaging" NeuroImage 20 (2003) 870-888 (19 pages).
Topup—FslWiki (ox.ac.uk) 2019 https://fsl.fmrib.ox.ac.uk/fsl/fslwiki/topup (2019) 1 page.

* cited by examiner

IMAGE PROCESSING APPARATUS FOR CORRECTING DISTORTIONS OF MAGNETIC RESONANCE IMAGES

CROSS-REFERENCE TO RELATED APPLICATIONS

This application is based upon and claims the benefit of priority from Japanese Patent Application No. 2022-003906, filed on Jan. 13, 2022, the entire contents of which are incorporated herein by reference.

FIELD

Embodiments described herein relate generally to an image processing apparatus, an image processing method, and a non-volatile computer-readable storage medium storing therein an image processing program.

BACKGROUND

Conventionally, a method has been proposed by which a difference in distortion directions between two images is used for reducing image distortions occurring in phase encoding directions in magnetic resonance imaging, the two images being obtained from acquisitions in a forward direction and a backward direction serving as the phase encoding directions. Typically, in the most commonly-used method, the difference in distortion between the two images is expressed with a cost mathematical function, so as to obtain a shift map used for correcting the distortions of the two images by solving an optimization problem to minimize the cost mathematical function. Examples of the cost mathematical function being proposed include a calculation of the least square of the difference between the two images, as well as a calculation further having an additional constraint term that inhibits changes in the shift map.

However, simply using the abovementioned cost mathematical function has the problem where there is a high risk of corrupting anatomical structures in the case where the images have strong distortions or where the two images have an unexpected difference (e.g., a large difference caused by a pixel compression associated with distortions or changes in a magnetic resonance signal of cerebrospinal fluid (CSF) or blood caused by pulsation) due to imperfection (e.g., pulsation and/or body movements) of the acquired images.

DETAILED DESCRIPTION

An image processing apparatus according to an embodiment includes processing circuitry. The processing circuitry is configured to obtain two magnetic resonance images corresponding to two phase encoding directions opposite to each other. The processing circuitry is configured to generate a shift map related to shifting a plurality of pixels in the two magnetic resonance images, by optimizing a cost function using a first difference between the two magnetic resonance images and a second difference between two edge images generated on the basis of the two magnetic resonance images. The processing circuitry is configured to generate a correction image obtained by correcting distortions of the two magnetic resonance images on the basis of the two magnetic resonance images and the shift map.

Figure 1:
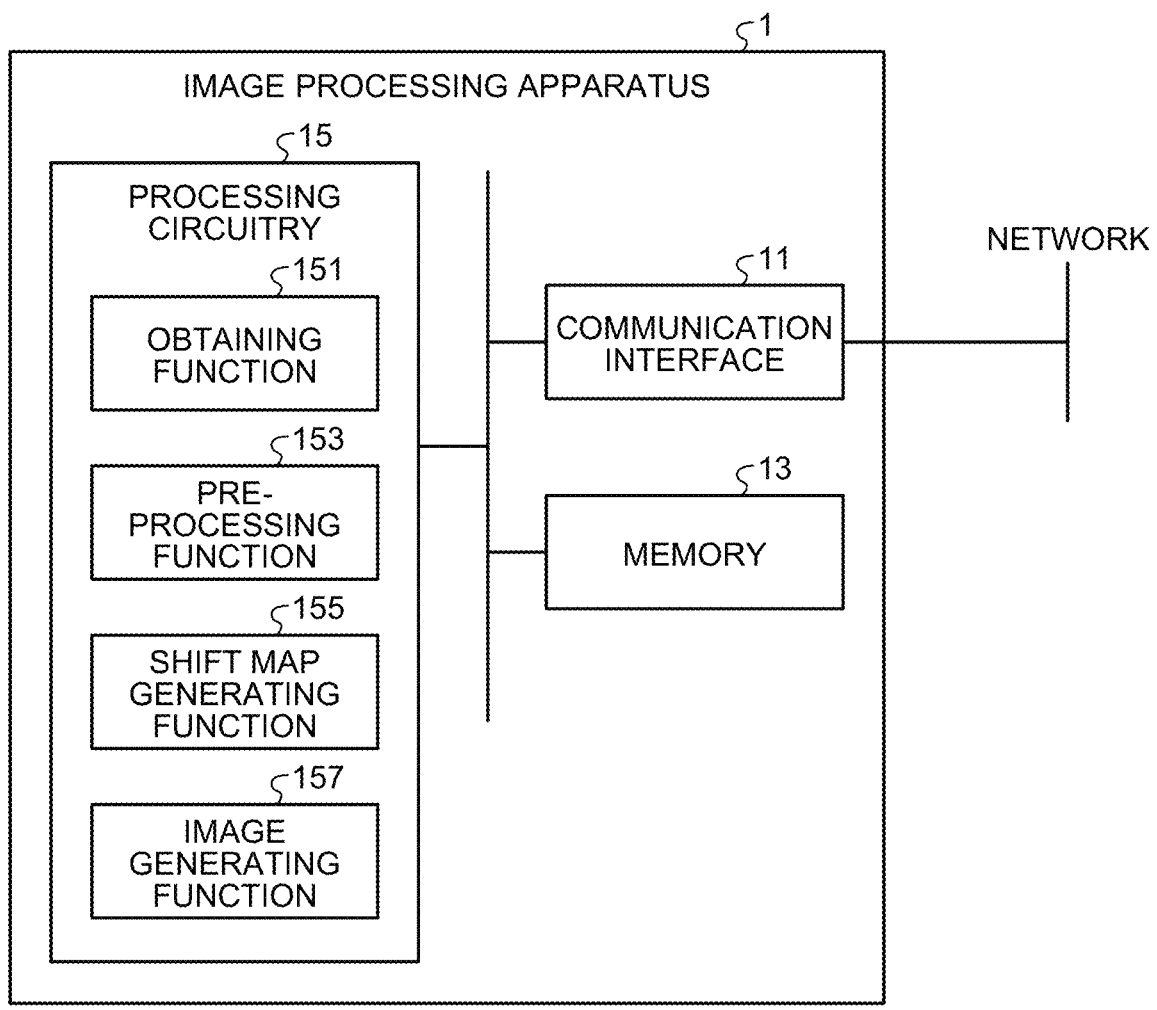
FIG. 1 is a block diagram illustrating an example of an image processing apparatus according to an embodiment.

Exemplary embodiments of an image processing apparatus, an image processing method, and an image processing program will be explained in detail below, with reference to the accompanying drawings. FIG. 1 is a block diagram illustrating an example of an image processing apparatus 1. The image processing apparatus 1 is installed, for example, in any of various types of modalities equipped with various types of functions included in the image processing apparatus 1 or a server provided in a hospital or the like. Alternatively, the various types of functions included in the image processing apparatus 1 may be installed in any of various types of server apparatuses such as a server in a medical image management system (hereinafter, "Picture Archiving and Communication System (PACS)") or a server in a Hospital Information System (hereinafter, "HIS").

Further, examples of the modalities equipped with the various types of functions of the image processing apparatus 1 include a Magnetic Resonance Imaging (MRI) apparatus, a Positron Emission Tomography (PET)-MRI apparatus, and a Single Photon Emission Computed Tomography (SPECT)-MRI apparatus. In the following sections, to explain specific examples, it is assumed that the image processing apparatus 1 is installed in an MRI apparatus. In that situation, the MRI apparatus has the various types of functions included in processing circuitry 15.

EMBODIMENTS

Figure 2:
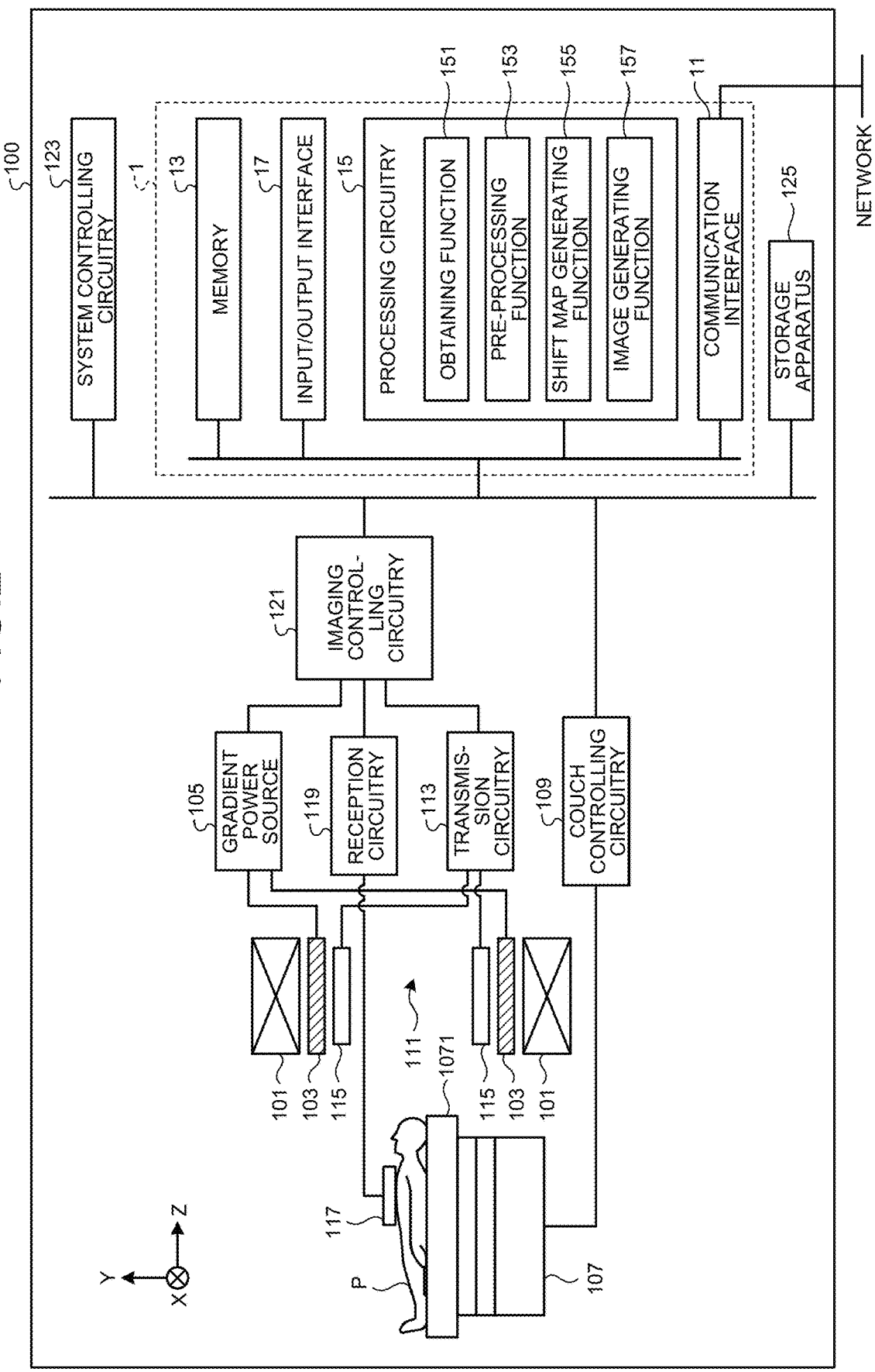
FIG. 2 is a diagram illustrating an example of a Magnetic Resonance Imaging (MRI) apparatus according to the embodiment.

FIG. 2 is a diagram illustrating an example of an MRI apparatus 100 according to an embodiment of the present disclosure. As illustrated in FIG. 2, the image processing apparatus 1 in the MRI apparatus 100 further includes an input/output interface 17. As illustrated in FIG. 1, the image processing apparatus 1 may not necessarily have the input/output interface 17 installed therein. As illustrated in FIG. 2, the MRI apparatus 100 includes a static magnetic field magnet 101, a gradient coil 103, a gradient power source 105, a couch 107, couch controlling circuitry (a couch controlling unit) 109, transmission circuitry 113, a transmission coil 115, a reception coil 117, reception circuitry 119, imaging controlling circuitry (an acquiring unit) 121, system controlling circuitry (a system controlling unit) 123, a storage apparatus 125, and the image processing apparatus 1.

The static magnetic field magnet 101 is a magnet formed to have a hollow and substantially circular cylindrical shape. The static magnetic field magnet 101 is configured to generate a substantially uniform static magnetic field in the space inside thereof. For example, a superconductive magnet or the like may be used as the static magnetic field magnet 101.

The gradient coil 103 is a coil formed to have a hollow and substantially circular cylindrical shape and is arranged on the inner surface side of a circular cylindrical cooling container. By individually receiving electric current supplies from the gradient power source 105, the gradient coil 103 is configured to generate gradient magnetic fields of which magnetic field intensities change along X-, Y-, and Z- axes that are orthogonal to one another. The gradient magnetic fields generated along the X-, Y-, and Z- axes by the gradient coil 103 form, for example, a slice selecting gradient magnetic field, a phase encoding gradient magnetic field, and a frequency encoding gradient magnetic field (which may also be called a read-out gradient magnetic field). The slice selecting gradient magnetic field is used for arbitrarily determining an imaged cross-sectional plane. The phase encoding gradient magnetic field is used for changing the phase of a magnetic resonance signal (hereinafter, "MR signal") in accordance with spatial positions. The frequency encoding gradient magnetic field is used for changing the frequency of an MR signal in accordance with spatial positions.

The gradient power source 105 is a power source apparatus configured to supply the electric currents to the gradient coil 103 under control of the imaging controlling circuitry 121.

The couch 107 is an apparatus provided with a couchtop 1071 on which an examined subject (hereinafter, "patient") P is placed. The couch 107 is configured to insert the couchtop 1071 on which the patient P is placed, into a bore 111, under control of the couch controlling circuitry 109.

The couch controlling circuitry 109 is circuitry configured to control the couch 107. The couch controlling circuitry 109 is configured to move the couchtop 1071 in longitudinal directions and up-and-down directions, as well as left-and-right directions in some situations, by driving the couch 107 according to instructions of an operator received via the input/output interface 17.

The transmission circuitry 113 is configured to supply a radio frequency pulse modulated with a Larmor frequency to the transmission coil 115, under control of the imaging controlling circuitry 121. For example, the transmission circuitry 113 includes an oscillating unit, a phase selecting unit, a frequency converting unit, an amplitude modulating unit, a Radio Frequency (RF) amplifier, and the like. The oscillating unit is configured to generate an RF pulse at a resonance frequency unique to targeted atomic nuclei placed in the static magnetic field. The phase selecting unit is configured to select a phase of the RF pulse generated by the oscillating unit. The frequency converting unit is configured to convert the frequency of the RF pulse output from the phase selecting unit. The amplitude modulating unit is configured to modulate the amplitude of the RF pulse output from the frequency converting unit, according to a sinc function, for example. The RF amplifier is configured to amplify the RF pulse output from the amplitude modulating unit and to supply the amplified RF pulse to the transmission coil 115.

The transmission coil 115 is a Radio Frequency (RF) coil arranged on the inside of the gradient coil 103. The transmission coil 115 is configured to generate an RF pulse corresponding to a radio frequency magnetic field in accordance with the output of the transmission circuitry 113.

The reception coil 117 is an RF coil arranged on the inside of the gradient coil 103. The reception coil 117 is configured to receive an MR signal emitted from the patient P, due to the radio frequency magnetic field. The reception coil 117 is configured to output the received MR signal to the reception circuitry 119. For example, the reception coil 117 is a coil array including one or more (typically two or more) coil elements. In the following sections, to explain a specific example, it will be assumed that the reception coil 117 is a coil array including two or more coil elements.

Alternatively, the reception coil 117 may be structured with a single coil element. Further, although FIG. 2 illustrates the example in which the transmission coil 115 and the reception coil 117 are separate RF coils, the transmission coil 115 and the reception coil 117 may be embodied as an integrally-formed transmission/reception coil. The transmission/reception coil corresponds to an imaged site of the patient P and is a local transmission/reception RF coil such as a head coil, for example.

Under control of the imaging controlling circuitry 121, the reception circuitry 119 is configured to generate a digital MR signal (hereinafter, "MR data") on the basis of the MR signal output from the reception coil 117. More specifically, the reception circuitry 119 is configured to generate the MR data, by performing various types of signal processing processes on the MR signal output from the reception coil 117 and subsequently performing an Analog-to-Digital (A/D) conversion on the data resulting from the various types of signal processing processes. The reception circuitry 119 is configured to output the generated MR data to the imaging controlling circuitry 121. For example, the MR data is generated for each of the coil elements and is output to the imaging controlling circuitry 121 together with tags identifying the coil elements.

The imaging controlling circuitry 121 is configured to perform an imaging process on the patient P, by controlling the gradient power source 105, the transmission circuitry 113, the reception circuitry 119, and the like, according to an image taking protocol output from the processing circuitry 15. The image taking protocol includes a pulse sequence corresponding to the type of a medical examination. The image taking protocol defines: a magnitude of the electric current to be supplied by the gradient power source 105 to the gradient coil 103; timing with which the electric current is to be supplied by the gradient power source 105 to the gradient coil 103; a magnitude and a time width of the radio frequency pulse to be supplied by the transmission circuitry 113 to the transmission coil 115; timing with which the radio frequency pulse is to be supplied by the transmission circuitry 113 to the transmission coil 115; timing with which the MR signal is to be received by the reception coil 117; and the like. When having received the MR data from the reception circuitry 119, as a result of imaging the patient P by driving the gradient power source 105, the transmission circuitry 113, the reception circuitry 119, and the like, the imaging controlling circuitry 121 is configured to transfer the received MR data to the image processing apparatus 1 or the like.

The imaging controlling circuitry 121 is realized by using a processor, for example. The imaging controlling circuitry 121 is configured to acquire two pieces of MR data corresponding to two phase encoding directions opposite to each other, by executing, for example, a pulse sequence for performing imaging processes along the two phase encoding directions opposite to each other. The two phase encoding directions opposite to each other are, for example, a direction in which the phase encoding line increases (hereinafter, "forward direction") and another direction in which the phase encoding line decreases (hereinafter, "backward direction") in a k-space. Further, to explain a specific example, it will be assumed that a sequence for acquiring the MR data along the forward direction and another sequence for acquiring the MR data along the backward direction are implemented by carrying out Echo Planar Imaging (EPI).

The sequence for acquiring the MR data along the forward direction and the sequence for acquiring the MR data along the backward direction do not necessarily have to be realized by carrying out EPI and may be realized by implementing a field echo method (which may be referred to as a gradient echo method), for example. In the following sections, the MR data acquired by carrying out EPI along the forward direction will be referred to as forward MR data. In contrast, the MR data acquired by carrying out EPI along the backward direction will be referred to as backward MR data. In this situation, the two pieces of MR data corresponding to the two phase encoding directions opposite to each other correspond to the forward MR data and the backward MR data.

In the above description, the example was explained in which the "processor" is configured to read and execute the programs corresponding to the functions from a memory 13; however, possible embodiments are not limited to this example. For example, the term "processor" denotes a Central Processing Unit (CPU), a Graphics Processing Unit (GPU), or circuitry such as an Application Specific Integrated Circuit (ASIC) or a programmable logic device (e.g., a Simple Programmable Logic Device (SPLD), a Complex Programmable Logic Device (CPLD), or a Field Programmable Gate Array (FPGA)).

For example, when the processor is a CPU, the processor is configured to realize the functions by reading and executing the programs saved in the memory 13. In another example, when the processor is an ASIC, instead of having the programs saved in the memory 13, the functions are directly incorporated in the circuitry of the processor as a logic circuit. The processors in the present embodiment do not each necessarily have to be structured as a single circuit. It is also acceptable to structure one processor, by combining together a plurality of independent circuits, so as to realize the functions thereof. Further, although the example was explained in which the single storage circuit is configured to store therein the programs corresponding to the processing functions, it is also acceptable to provide a plurality of storage circuits in a distributed manner, so that the processing circuit reads a corresponding program from each of the individual storage circuits.

The system controlling circuitry 123 includes, as hardware resources thereof, a processor and memory elements such as a Read-Only Memory (ROM), a Random Access memory (RAM), and/or the like (not illustrated) and is configured to control the MRI apparatus 100 by employing a system controlling function. More specifically, the system controlling circuitry 123 is configured to read a system controlling program stored in the storage apparatus 125, to load the read program into a memory, and to control circuits in the MRI apparatus 100 according to the loaded system controlling program. For example, the system controlling circuitry 123 is configured to read the image taking protocol from the storage apparatus 125, on the basis of an image taking condition input by the operator via the input/output interface 17. The system controlling circuitry 123 is configured to transmit the image taking protocol to the imaging controlling circuitry 121 and to control the imaging process performed on the patient P. For example, the system controlling circuitry 123 is realized by using a processor. Alternatively, the system controlling circuitry 123 may be incorporated in the processing circuitry 15. In that situation, the system controlling function is implemented by the processing circuitry 15, so that the processing circuitry 15 functions as a substitute for the system controlling circuitry 123.

The storage apparatus 125 is configured to store therein various types of programs executed by the system controlling circuitry 123, various types of image taking protocols, image taking conditions including a plurality of image taking parameters defining the image taking protocols, and the like. The storage apparatus 125 may be, for example, a semiconductor memory element such as a RAM or a flash memory, a Hard Disk Drive (HDD), a Solid State Drive (SSD), an optical disc, or the like. Further, the storage apparatus 125 may be a Compact Disc Read-Only Memory (CD-ROM) drive, a Digital Versatile Disc (DVD) drive, a drive apparatus configured to read and write various types of information from and to a portable storage medium such as a flash memory, or the like. Alternatively, the data stored in the storage apparatus 125 may be stored in the memory 13. In that situation, the memory 13 functions as a substitute for the storage apparatus 125.

The image processing apparatus 1 includes a communication interface 11, the memory 13, and the processing circuitry 15. As illustrated in FIGS. 1 and 2, in the image processing apparatus 1, the communication interface 11, the memory 13, and the processing circuitry 15 are electrically connected together by a bus. As illustrated in FIGS. 1 and 2, the image processing apparatus 1 is connected to a network via the communication interface 11. For example, the image processing apparatus 1 is connected to the network, so as to be able to mutually communicate with various types of modalities and information processing systems in the medical institution such as the HIS, a Radiology Information System (RIS), and/or the like. Further, the image processing apparatus 1 illustrated in FIG. 1 may include an input interface for inputting various types of information of the user and a display apparatus (an output interface) for displaying medical images generated by an image generating function 157, as the input/output interface 17 as illustrated in FIG. 2.

For example, the communication interface 11 is configured to perform data communication with various types of modalities that image the patient P in medical examinations for the patient P, the HIS, the PACS, and/or the like. The standard of the communication between the communication interface 11 and each of the various types of modalities and the hospital information system may be any standard, but may use, for example, one or both of Health Level 7 (HL7) and Digital Imaging and Communications in Medicine (DICOM). In the situation where the image processing apparatus 1 functions as a separate entity from the modalities, the communication interface 11 is configured to receive, from the modalities, a magnetic resonance image (hereinafter, "forward MR image") generated on the basis of the forward MR data and a magnetic resonance image (hereinafter, "backward MR image") generated on the basis of the backward MR data. The forward MR image and the backward MR image correspond to two magnetic resonance images (MR images) corresponding to two phase encoding directions opposite to each other.

The memory 13 is realized by using storage circuitry configured to store therein various types of information. For example, the memory 13 is a storage device such as an HDD, an SSD, or an integrated circuit storage device. The memory 13 corresponds to a storage unit. Other than being an HDD or an SSD, the memory 13 may be a semiconductor memory element such as a Random Access Memory (RAM) or a flash memory, an optical disc such as a Compact Disc (CD) or a Digital Versatile Disc (DVD), or a drive apparatus configured to read and write various types of information from and to a portable storage medium or a semiconductor memory element such as a RAM.

The memory 13 is configured to store therein an obtaining function 151, a pre-processing function 153, a shift map generating function 155, and the image generating function 157 realized by the processing circuitry 15, in the form of computer-executable programs. The memory 13 is configured to store therein various types of data received by the obtaining function 151 via the communication interface 11. More specifically, for example, the memory 13 is configured to store therein the two MR images (the forward MR image and the backward MR image) that were obtained by the obtaining function 151 and correspond to the two phase encoding directions opposite to each other.

Further, the memory 13 is configured to store therein a shift map (hereinafter, "tentative shift map") that is tentative and was tentatively generated by the shift map generating function 155 in an optimization process of a cost mathematical function (hereinafter, "cost function"). The optimizing process of the cost function is, for example, to determine a shift map so as to minimize a cost value calculated by the cost function. The shift map is a map used for reducing image distortions along the phase encoding directions, with respect to the forward MR image and the backward MR image. More specifically, the shift map is a map indicating a shift amount of each pixel along the phase encoding directions, with respect to each of the plurality of pixels in the forward MR image and the backward MR image.

As an expression of the shift map, a shift map fitting model may be used. The fitting model corresponds to a result of converting the shift map into a model by using a fitting mathematical function. The fitting mathematical function may be a cubic spline fitting function, for example. However, possible embodiments are not limited to this example, and it is acceptable to use other known mathematical functions. In this situation, for example, the shift map is reproduced by convoluting a predetermined kernel in a coefficient distribution of the fitting model. As a result, the data amount of the fitting model is smaller than the data amount of the shift map.

Figure 3:
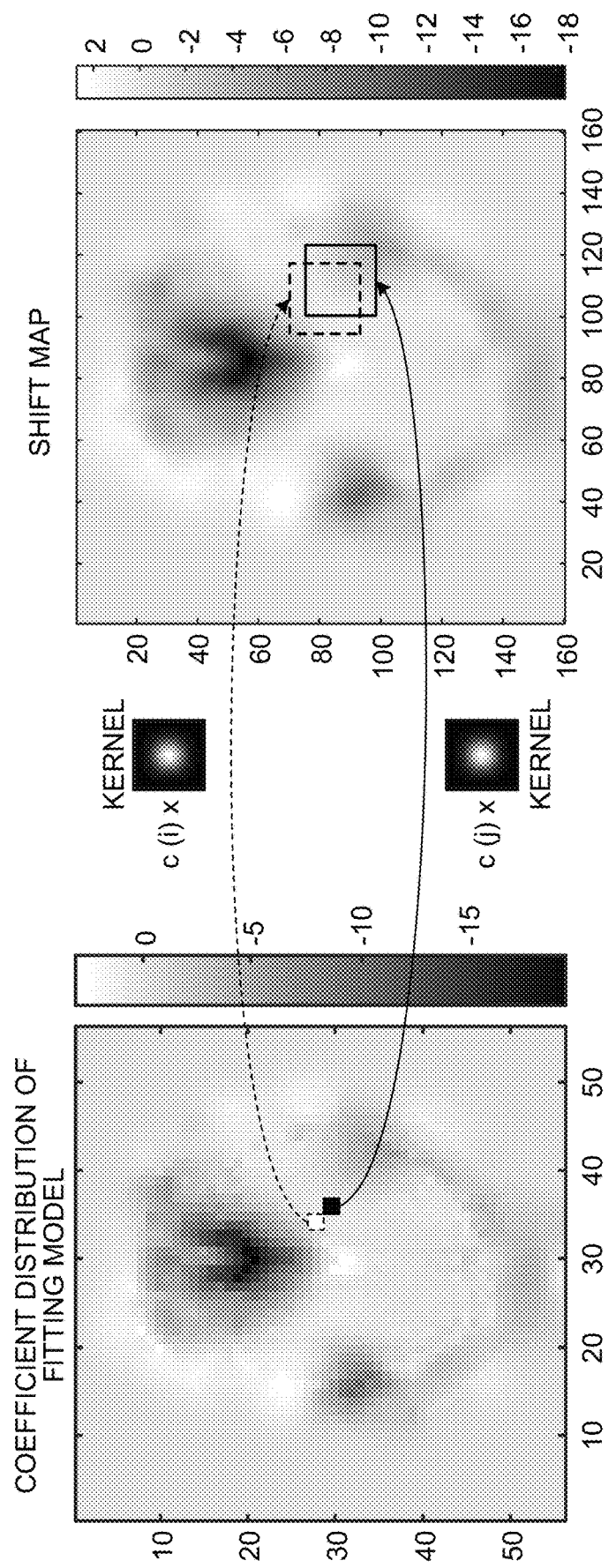
FIG. 3 is a drawing according to the embodiment illustrating an example of a relationship between a coefficient distribution of a fitting model and a shift map.

FIG. 3 is a drawing illustrating an example of a relationship between a coefficient distribution of the fitting model and the shift map. As illustrated in FIG. 3, the shift map and the coefficient distribution of the fitting model are in one-to-one correspondence with each other via the convolution using the kernel. When a shift map and a fitting model are used, the distribution of the plurality of coefficients in the fitting model corresponds to variables in the optimization problem related to the cost function explained later. Further, as illustrated in FIG. 3, the coefficient distribution of the fitting model has a smaller data amount than the shift map. When the fitting model is used as an expression of the shift map, the calculation cost and the calculation time period related to generating the fitting model are smaller than those of the shift map.

Further, the memory 13 is configured to store therein a condition (hereinafter, "optimization judgment condition") used for judging completion of the optimization process, with respect to the optimization process of the cost function carried out by the shift map generating function 155. The optimization judgment condition may be, for example, the number of times (hereinafter, "optimization number of times") an iterative calculation related to the optimization process is performed, a value (hereinafter, "cost threshold value") to be compared with a value calculated by the cost function, or the like. Possible examples of the optimization judgment condition are not limited to those described above. It is acceptable to use any of known judgment conditions related to optimization problems.

Further, the memory 13 is configured to store therein a judgment condition (hereinafter, "iteration judgment condition") related to an iteration of the optimization process. The iteration judgment condition may be, for example, a smoothing level or a resolution regarding the forward MR image and the backward MR image, the number of times the optimization process is iterated, the rate of change of the shift map associated with the iteration of the optimization process, or the like. Possible examples of the iteration judgment condition are not limited to those described above. It is acceptable to use any of known judgment conditions.

Further, the memory 13 is configured to store therein MR images generated by the image generating function 157. Examples of the MR images generated by the image generating function 157 include: a correction image obtained by correcting distortions of the forward MR image and the backward MR image on the basis of the forward MR image, the backward MR image, and the shift map; the forward MR image; the backward MR image; and the like.

The processing circuitry 15 is configured to control the entirety of the image processing apparatus 1. The processing circuitry 15 is realized by using the abovementioned processor or the like. The processing circuitry 15 includes the obtaining function 151, the pre-processing function 153, the shift map generating function 155, and the image generating function 157, or the like. The processing circuitry 15 realizing the obtaining function 151, the pre-processing function 153, the shift map generating function 155, and the image generating function 157 corresponds to an obtaining unit, a pre-processing unit, a shift map generating unit, and an image generating unit, respectively. The functions such as the pre-processing function 153, the shift map generating function 155, and the image generating function 157 are stored in the memory 13, in the form of computer-executable programs. The processing circuitry 15 is a processor. For example, the processing circuitry 15 is configured to realize the functions corresponding to the programs by reading and executing the programs from the memory 13. In other words, the processing circuitry 15 that has read the programs has the functions such as the pre-processing function 153, the shift map generating function 155, and the image generating function 157, or the like.

By employing the obtaining function 151, the processing circuitry 15 is configured to obtain the two MR images corresponding to the two phase encoding directions opposite to each other. More specifically, the obtaining function 151 is configured to obtain the forward MR image and the backward MR image corresponding to the two MR images, by generating the forward MR image on the basis of the forward MR data and generating the backward MR image on the basis of the backward MR data. Alternatively, the generation of the forward MR image and the backward MR image may be realized by the image generating function 157. In that situation, the image generating function 157 may be configured to generate the forward MR image by performing a Fourier transform on the forward MR data and to generate the backward MR image by performing a Fourier transform on the backward MR data.

Further, in an example where the processing circuitry 15 is installed in the stand-alone image processing apparatus 1 as illustrated in FIG. 1, the obtaining function 151 is configured to obtain the forward MR image and the backward MR image from the PACS, a modality, or the like, via the network and the communication interface 11. The obtaining function 151 is configured to store the obtained forward MR image and backward MR image, into the memory 13.

By employing the pre-processing function 153, the processing circuitry 15 is configured to generate edge images of the two MR images, by performing the iterative calculation in the optimization process of the const function.

Alternatively, the pre-processing function 153 may generate the edge images by performing a brightness correction using the tentative shift map, on the two MR images. More specifically, the pre-processing function 153 may be configured to calculate the Jacobian of the tentative shift map. A map (hereinafter, "shift Jacobian map") of the Jacobian of the tentative shift map corresponds, for example, to a map indicating degrees by which brightness values are to be reduced in accordance with the shifting of the pixels by the shift amounts, with respect to a region having higher brightness due to compression of brightness values associated with image distortions along the phase encoding directions. The pre-processing function 153 is configured to multiply the forward MR image and the backward MR image each by the shift Jacobian map. In this manner, the pre-processing function 153 is configured to generate an image (hereinafter, "brightness corrected forward image") obtained by performing the brightness correction on the forward MR image prior to a position correction and an image (hereinafter, "brightness corrected backward image") obtained by performing a brightness correction on the backward MR image prior to a position correction.

The pre-processing function 153 is configured to generate the two edge images by performing an edge extracting process on the brightness corrected forward image prior to the position correction and on the brightness corrected backward image prior to the position correction. The two edge images include a forward edge image corresponding to the forward MR image and a backward edge image corresponding to the backward MR image. The two edge images generated in the abovementioned process correspond to images from which it is possible to properly extract anatomical structures in the forward MR image and the backward MR image as edges, because the brightness made higher by the image distortions along the phase encoding directions are reduced.

By employing the shift map generating function 155, the processing circuitry 15 is configured to set parameters related to a correcting process described below. The parameters related to the correcting process may be a parameter of the fitting model of the shift map, the abovementioned judgment condition, and/or the like. Further, by optimizing a cost function using a first difference between the two MR images and a second difference between the two edge images generated on the basis of the two MR images, the shift map generating function 155 is configured to generate a shift map related to shifting the plurality of pixels in the two magnetic resonance images. The cost function includes a regularization parameter to be multiplied by the second difference. When performing the iterative calculation related to the optimization of the cost function, the shift map generating function 155 is configured to increase the value of the regularization parameter in accordance with the number of times the iterative calculation is iterated. As a result, the shift map generating function 155 is able to strengthen a constraint by squared errors in the two edge images in association with the reduction of the cost function. Thus, the shift map maintaining the anatomical structures in the MR images is generated.

By employing the image generating function 157, the processing circuitry 15 is configured to generate the correction image obtained by correcting the distortions of the two magnetic resonance images, on the basis of the two magnetic resonance images and the shift map generated by the shift map generating function 155. More specifically, the image generating function 157 is configured to generate a position corrected forward MR image and a position corrected backward MR image, by performing a position correction on the two magnetic resonance images while using the shift map. Subsequently, the image generating function 157 is configured to generate a Jacobian map on the basis of the shift map. After that, the image generating function 157 is configured to generate a forward MR image and a backward MR image in which the positions and the brightness have been corrected, by multiplying the position corrected forward MR image and the position corrected backward MR image each by the Jacobian map. Lastly, the image generating function 157 is configured to generate the correction image by calculating an average of the forward MR image and the backward MR image in which the positions and the brightness have been corrected. The correction image is an MR image in which the image distortions between the forward MR image and the backward MR image have been corrected. In other words, the correction of the image distortions corresponds to a result of combining together the position correction of the pixels using the shift map and the brightness correction using the Jacobian map based on the shift map.

The correcting process performed by the MRI apparatus 100 according to the present embodiment structured as described above will be explained, with reference to FIGS. 4 to 7. The correcting process is a process of reducing the image distortions occurring along the phase encoding directions, while maintaining the anatomical structures in the images to be corrected. As a result of the two magnetic resonance images being corrected by the correcting process, the correction image is generated. In the following sections, to explain a specific example, it is assumed that the two MR images used in the correcting process are the forward MR image and the backward MR image obtained by carrying out EPI.

Figure 4:
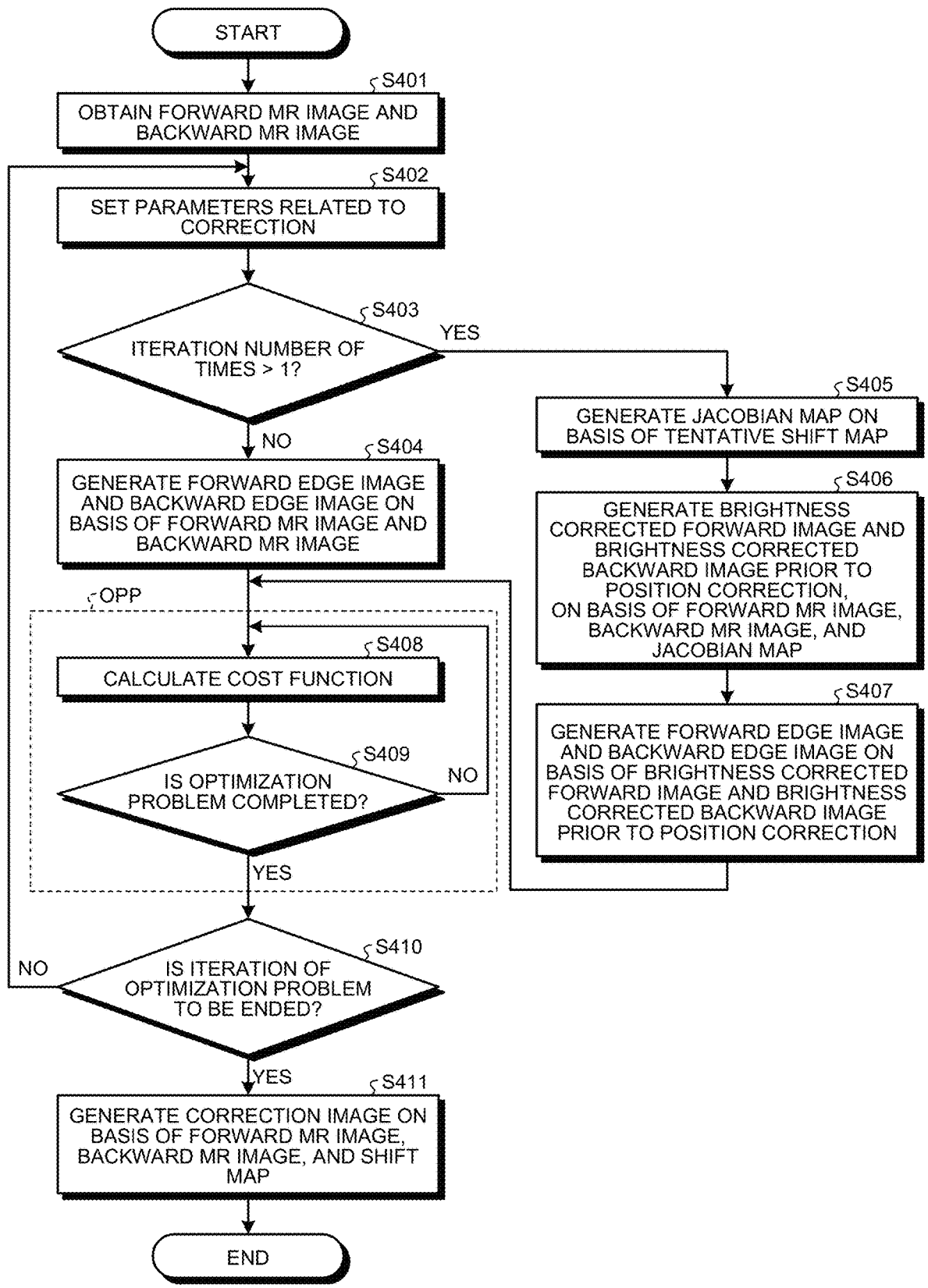
FIG. 4 is a flowchart according to the embodiment illustrating an example of a procedure in a correcting process.

FIG. 4 is a flowchart illustrating an example of a procedure in the correcting process. Before the correcting process illustrated in FIG. 4 is performed, the imaging controlling circuitry 121 carries out, on the patient P, two EPI processes corresponding to the two phase encoding directions opposite to each other. As a result of carrying out the two EPI processes, the imaging controlling circuitry 121 acquires the forward MR data and the backward MR data. Subsequently, by employing the image generating function 157, the processing circuitry 15 generates the forward MR image and the backward MR image. The memory 13 stores therein the generated forward MR image and backward MR image.

Correcting Process

Step S401:

By employing the obtaining function 151, the processing circuitry 15 obtains the forward MR image and the backward MR image from the memory 13. In an example where the processing circuitry 15 is installed in a stand-alone image processing apparatus 1, the obtaining function 151 obtains the forward MR image and the backward MR image, from the PACS, a modality, or the like via the network and the communication interface 11.

By employing the shift map generating function 155, the processing circuitry 15 sets, as the parameters related to the correcting process, the iteration number of times, a parameter (a coefficient) of the fitting model of the shift map, the iteration number of times in the optimization problem, and/or the like. The parameter setting process may be carried out, for example, according to a user instruction received via the input/output interface 17, before the correcting process is executed. The parameters related to the correction such as the optimization judgment condition and the iteration judgment condition, for example, are stored in the memory 13. The optimization judgment condition will be used at step S410 described later. The iteration judgment condition will be used at step S411 described later.

Step S403:

When the iteration number of times related to generating the shift map is smaller than 1 (step S403: No), the process at step S404 will be performed. On the contrary, when the iteration number of times related to generating the shift map is 1 or larger (step S403: Yes), the process at step S405 will be performed. The judgment at the present step is made by the shift map generating function 155, for example.

Step S404:

By employing the pre-processing function 153, the processing circuitry 15 generates the forward edge image and the backward edge image on the basis of the forward MR image and the backward MR image. For the edge extracting process related to generating the edge images, because it is possible to use a known method as appropriate, such as a Canny method or a thinning and binarization method (discarding pixel values by using a lower threshold value and clipping pixel values by using a higher threshold value), explanations thereof will be omitted.

Step S405:

By employing the pre-processing function 153, the processing circuitry 15 generates the Jacobian map on the basis of the tentative shift map. More specifically, the pre-processing function 153 generates the Jacobian map by calculating the Jacobian with respect to each of the pixels (calculating partial differentiation of a variable (position coordinates) with respect to the shift amount), while using the shift amount of each of the plurality of pixels in the tentative shift map.

Step S406:

By employing the pre-processing function 153, the processing circuitry 15 generates the brightness corrected forward image and the brightness corrected backward image, on the basis of the forward MR image, the backward MR image, and the Jacobian map. More specifically, the pre-processing function 153 generates the brightness corrected forward image by multiplying the forward MR image by the Jacobian map. Also, the pre-processing function 153 generates the brightness corrected backward image, by multiplying the backward MR image by the Jacobian map.

Figure 5:
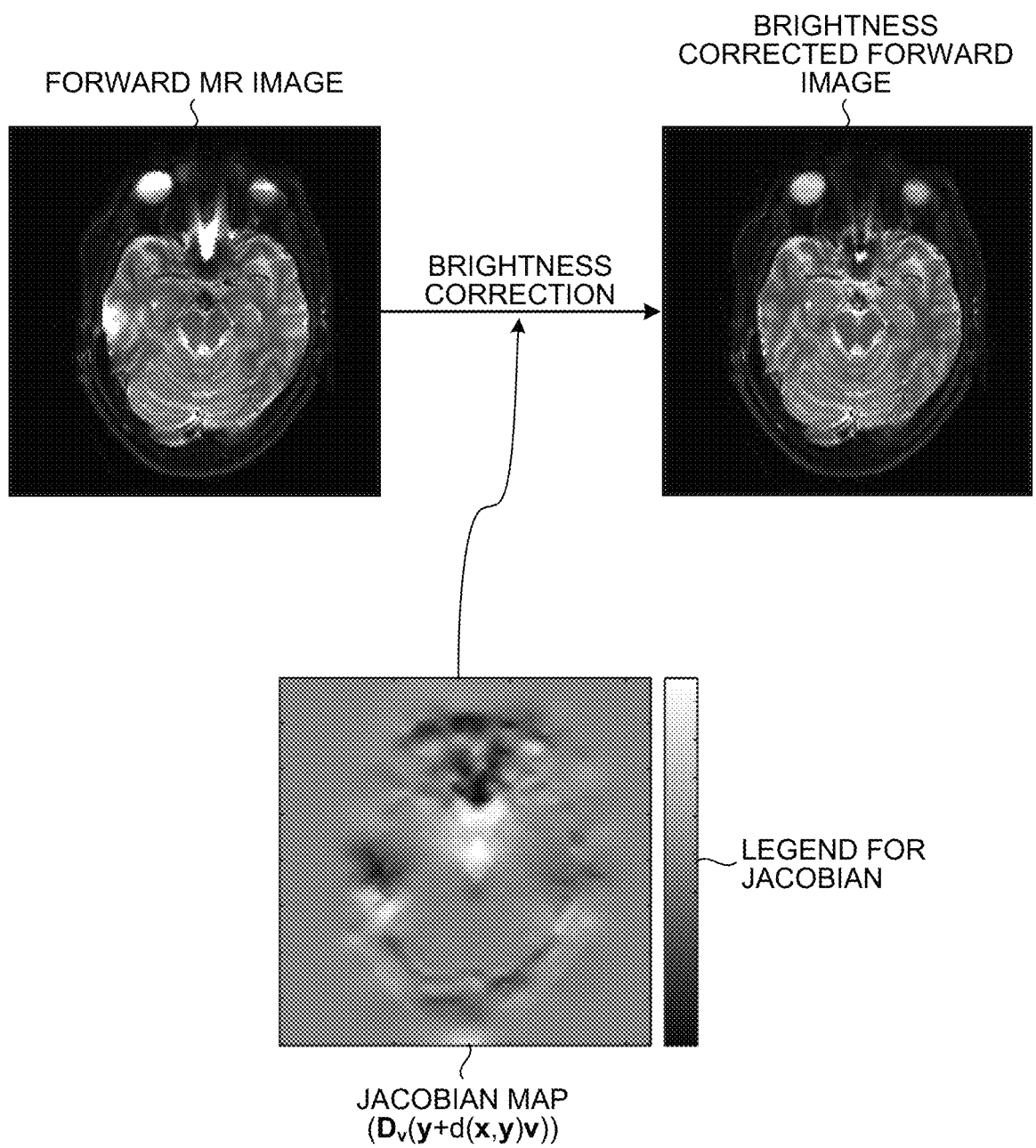
FIG. 5 is a drawing according to the embodiment illustrating an example of a brightness corrected forward image generated from a position corrected forward image.

FIG. 5 is a drawing illustrating an example of the brightness corrected forward image generated from the forward MR image. As illustrated in FIG. 5, each of a plurality of pixels in the Jacobian map has a value (Dv(y+d(x,y)v)) that reduces the brightness value in accordance with shifting of a pixel by a shift amount (d(x,y)), with respect to higher brightness occurring in association with distortions (pixel compression) along a phase encoding direction y.

Accordingly, as illustrated in FIG. 5, a brightness corrected forward image is generated by reducing the brightness values in the forward MR image while using the Jacobian map, in accordance with the shift amount (d(x,y)) corresponding to the position of the pixel. As illustrated in FIG. 5, in the brightness corrected forward image, the higher brightness regions (the white parts) caused by the distortions in the phase encoding directions have been improved, as compared with the forward MR image.

Step S407:

By employing the pre-processing function 153, the processing circuitry 15 generates the forward edge image and the backward edge image, on the basis of the brightness corrected forward image and the brightness corrected backward image. More specifically, the pre-processing function 153 generates the forward edge image by performing the edge extracting process on the brightness corrected forward image. Also, the pre-processing function 153 generate the backward edge image by performing the edge extracting process on the brightness corrected backward image.

The forward MR image and the backward MR image exhibit the brightness compression caused by the distortions. Thus, if the edges were extracted from the forward MR image and from the backward MR image, elements that are not actually present as structures would be extracted as edges. In contrast, as presented at step S407, because impacts of the brightness compression are reduced in the brightness corrected forward image and the brightness corrected backward image prior to the position correction, it is possible to generate the edge images that better reflect anatomical structures. In other words, at step S407, it is possible to obtain the edge images in which impacts of the changes in the brightness values are reduced in grids prior to the position correction, by extracting the edges from the brightness corrected forward image and the brightness corrected backward image prior to the position correction. By preparing, in advance, the edge images having the grids prior to the position correction, it is possible to simplify the Jacobian of the cost function in the optimization calculation performed for an optimization problem OPP.

Step S408:

By employing the shift map generating function 155, the processing circuitry 15 calculates a cost value from the cost function. A cost function Cost may be expressed by using Expression (1) presented below, for example.

$$\mathrm{Cost} = (f_+ - f_-)^T (f_+ - f_-) + \lambda_1 B + \lambda_2 (E_+ - E_-)^T (E_+ - E_-) \ldots \quad (1)$$

As indicated in Expression (1), the cost function Cost includes, for example, a first Sum of Squared Errors (SSE) based on the first difference between the forward MR image and the backward MR image; a second sum of squared errors based on the second difference between the forward edge image and the backward edge image; a constraint term B indicating a degree of bending of the calculated shift map; a first regularization parameter $\lambda_1$ to be multiplied by the constraint term B; and a second regularization parameter $\lambda_2$ to be multiplied by the second sum of squared errors. The first term on the right-hand side of Expression (1) denotes the first sum of squared errors. The second term on the right-hand side of Expression (1) denotes a result of multiplying the first regularization parameter $\lambda_1$ by the constraint term B. The third term on the right-hand side of Expression (1) denotes a result of multiplying the second regularization parameter $\lambda_2$ by the second sum of squared errors.

In Expression (1), the vector $f_+$ denotes a column vector having pixel values in the forward MR image as elements thereof. In Expression (1), the vector $f_-$ denotes a column vector having pixel values in the backward MR image as elements of the vector. Examples of an index of a scalar value B in Expression (1) include bending energy of the shift map.

The vector $E_+$ in Expression (1) denotes, before the optimization problem OPP is implemented, a column vector having pixel values in the forward edge image as elements thereof. In contrast, after the optimization problem OPP is implemented, the vector $E_+$ in Expression (1) denotes a column vector having, as elements thereof, pixel values in the forward edge image in which the positions have been corrected while using the tentative shift map generated by the shift map generating function 155. The position correction using the tentative shift map is performed by the shift map generating function 155 at a stage prior to the calculation of the cost function at the present step.

The vector $E_-$ in Expression (1) denotes, before the optimization problem OPP is implemented, a column vector having pixel values in the backward edge image as elements of the vector. In contrast, after the optimization problem OPP is implemented, the vector $E_{31}$ in Expression (1) denotes a column vector having, as elements thereof, pixel values in the backward edge image in which the positions have been corrected while using the tentative shift map generated by the shift map generating function 155. The position correction using the tentative shift map is performed by the shift map generating function 155 at a stage prior to the calculation of the cost function at the present step.

In the optimization of the cost function, the first sum of squared errors acts on the cost function so as to decrease the first difference. Further, in the optimization of the cost function, the second sum of squared errors acts on the cost function so as to decrease the second difference. In the optimization of the cost function, the constraint term B acts on the cost function, so as to reduce the bending degree of the shift map and to also smooth the changes in the shift amounts in the shift map. The first regularization parameter is a parameter indicating the degree of a contribution made by the constraint term to the cost function. The second regularization parameter is a parameter indicating the degree of a contribution made by the second sum of squared errors to the cost function.

Step S409:

When the optimization problem is not completed, i.e., when the optimization judgment condition is not satisfied (step S409: No), the process at step S408 will be repeatedly performed. The optimization problem is determined to be completed, for example, when the cost value has converged, when the number of times of the cost value calculation has reached the predetermined iteration number of times, or the like, and the judgment is made by the shift map generating function 155. In that situation, for example, the shift map generating function 155 changes the variables in the shift map, i.e., the shift amounts, on the basis of the Jacobian of the shift map related to the cost function. When the optimization problem is completed, i.e., when the optimization condition is satisfied (step S409: Yes), the process at step S410 will be performed. In that situation, the shift map generating function 155 determines the most up-to-date shift map as a tentative shift map.

Step S410:

By employing the shift map generating function 155, the processing circuitry 15 determines whether or not the iteration for the optimization problem OPP needs to be ended, according to the iteration judgment condition. When it is determined that the iteration for the optimization problem OPP is to be ended, i.e., when the iteration judgment condition is satisfied (step S410: Yes), the process at step S411 will be performed. The shift map generating function 155 determines the tentative shift map as a shift map to be applied to the forward MR image and the backward MR image. On the contrary, when it is not determined that the iteration for the optimization problem OPP is to be ended, i.e., when the iteration judgment condition is not satisfied (step S410: No), the process at step S402 and thereafter will be repeatedly performed. In that situation, the shift map generating function 155 may increase the second regularization parameter $\lambda_2$ at step S402. On such occasion, a larger contribution is made to the cost value by the second sum of squared errors in an upcoming process at step S408.

By employing the image generating function 157, the processing circuitry 15 generates the correction image, on the basis of the forward MR image, the backward MR image, and the shift map. More specifically, the image generating function 157 moves a plurality of pixel values in the forward MR image, by applying the shift map to the forward MR image. As a result, the image generating function 157 generates the position corrected forward MR image. Also, the image generating function 157 moves a plurality of pixel values in the backward MR images, by applying the shift map to the backward MR image.

Further, the image generating function 157 generates the Jacobian map on the basis of the shift map. The image generating function 157 generates the forward MR image and the backward MR image in which the positions and the brightness have been corrected, by multiplying the position corrected forward MR image and the position corrected backward MR image by the Jacobian map. The forward MR image and the backward MR image in which the positions and the brightness have been corrected correspond to a forward MR image and a backward MR image in which distortions have been corrected. The image generating function 157 generate the correction image by calculating an average of the forward MR image and the backward MR image in which the positions and the brightness have been corrected. Thus, the correcting process ends.

The image processing apparatus 1 and the MRI apparatus 100 according to the embodiment described above are configured: to obtain the two magnetic resonance images corresponding to the two phase encoding directions opposite to each other; to generate the shift map related to shifting the plurality of pixels in the two magnetic resonance images, by optimizing the cost function using the first difference between the two magnetic resonance images and the second difference between the two edge images generated on the basis of the two magnetic resonance images; and to generate the correction image obtained by correcting the distortions of the two magnetic resonance images on the basis of the two magnetic resonance images and the shift map. With this configuration, the image processing apparatus 1 and the MRI apparatus 100 according to the embodiment are able to solve the optimization problem of the cost function, by adding, to the cost function, edge differences between the two images, as the constraint term that maintains the anatomical structures. Consequently, the image processing apparatus 1 and the MRI apparatus 100 according to the embodiment are able to obtain the correction image (the MR image) in which the distortions are reduced while the anatomical structures are maintained.

Further, in the image processing apparatus 1 and the MRI apparatus 100 according to the present embodiment, the cost function further includes the second regularization parameter $\lambda_2$ to be multiplied by the second difference. When the optimization of the cost function is performed multiple times, the value of the second regularization parameter $\lambda_2$ is increased in accordance with how many times the optimization is iterated (the iteration number of times of the optimization). With this configuration, the image processing apparatus 1 and the MRI apparatus 100 according to the embodiment are able to increase, in accordance with the iteration, the contribution made to the cost function by the differences (the second sum of squared errors expressed as the difference between the two edge images) in the anatomical structures between the two images, so as to follow improvements in the precision level for the estimate of the distortions corresponding to the iterative generation of the shift map. Consequently, the image processing apparatus 1 and the MRI apparatus 100 according to the embodiment are able to obtain the correction image in which the distortions are further reduced, while the anatomical structures are further maintained.

Moreover, the image processing apparatus 1 and the MRI apparatus 100 according to the embodiment are configured to generate the edge images by using the tentative shift map tentatively generated during the iteration of the optimization of the cost function. With this configuration, the image processing apparatus 1 and the MRI apparatus 100 according to the embodiment are able to obtain the correction image, without lowering the precision level of the correction, because the cost function uses the edge images in which the distortions have tentatively been corrected (with the brightness correction and the position correction) while using the tentative shift map.

Furthermore, the image processing apparatus 1 and the MRI apparatus 100 according to the embodiment are configured to generate the edge images, by performing the brightness correction using the tentative shift map, on the two magnetic resonance images. With this configuration, the image processing apparatus 1 and the MRI apparatus 100 according to the embodiment are able to generate the edge images by reducing the brightness values to appropriate distortion-corrected levels, in the region having the higher brightness due to the pixel value compression associated with the image distortions. In other words, at the time of evaluating the edge differences, it is possible to extract the edges that are worth the evaluation, even from sections where the cost function evaluation using the edge differences is not suitable (e.g., sections where the brightness values changed due to the distortions). With this configuration, the image processing apparatus 1 and the MRI apparatus 100 according to the embodiment are able to generate the edge images by reducing the higher brightness occurring in association with the distortions (the pixel compression) along the phase encoding direction y, after the tentative distortion correction using the tentative shift map, so as to use the edge images in the cost function. It is therefore possible to obtain the correction image in which the distortions are further reduced, while the anatomical structures are further maintained.

As explained above, the image processing apparatus 1 and the MRI apparatus 100 according to the embodiment are able to generate the shift map capable of maintaining the anatomical structures, even when the two MR images to be corrected having the mutually-different phase encoding directions have strong image distortions or even when the two images have an unexpected difference (e.g., a large difference caused by the pixel compression associated with the distortions or changes in the magnetic resonance signal of cerebrospinal fluid (CSF) or blood caused by pulsation) due to imperfection (e.g., pulsation and/or body movements) of the acquired images.

Figure 7:
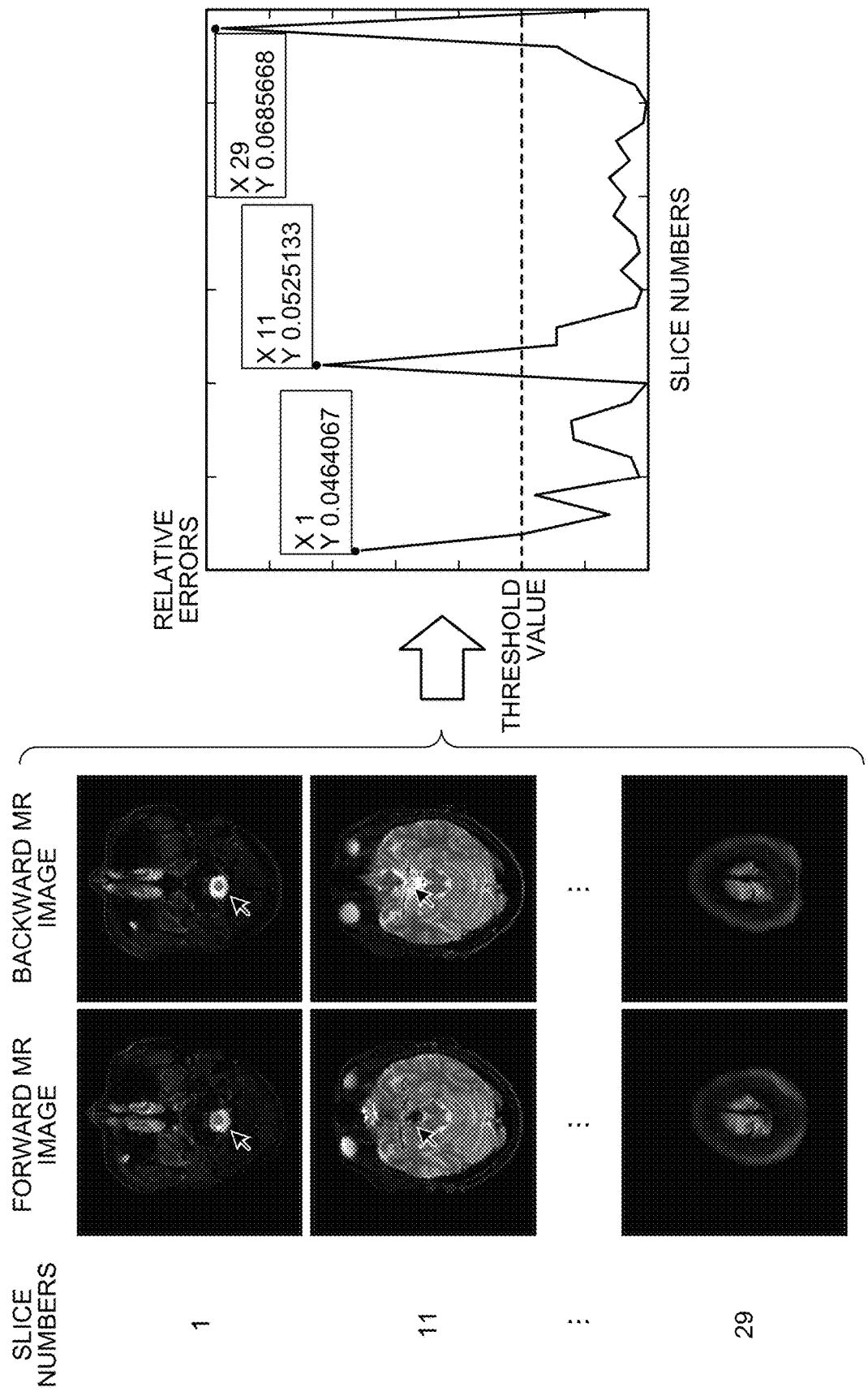
FIG. 7 is a drawing according to the second application example of the embodiment illustrating an example of a distribution of relative errors in relation to slice numbers and a threshold value.

In addition, when the image processing apparatus 1 and the MRI apparatus 100 according to the embodiment are used, the components that fluctuate with respect to the variables (the shift map) in the optimization problem are only those from the shifts of the edge images, which are determined in advance. It is therefore possible to express the Jacobian of the cost function by using the simple expression. Consequently, the optimization problem converges faster than in the situation where a cost is calculated from an edge image extracted from an image in which distortions are corrected within the optimization problem. Furthermore, by performing the pre-processing process related to the generation of the edge images, the image processing apparatus 1 and the MRI apparatus 100 according to the embodiment are able to improve the precision level of the edge extraction from the distorted regions, as illustrated in FIG. 7.

As explained above, the image processing apparatus 1 and the MRI apparatus 100 according to the embodiment are able to generate the correction image in which the image distortions (artifacts) occurring along the phase encoding directions have been reduced, while the anatomical structures are maintained. Consequently, the image processing apparatus 1 and the MRI apparatus 100 according to the present embodiment are able to improve efficiency in image interpretation performed by image interpreting doctors, for example, and are thus able to improve a throughput of diagnosing processes performed for the patient P.

First Application Example

In the present application example, the second difference is multiplied by a weight decreased in accordance with the magnitude of the shift amounts in the tentative shift map. In other words, the cost function in the present application example includes the weight to be multiplied in accordance with the shift amount, with respect to each of the plurality of pixels regarding the second difference. By employing the shift map generating function 155, the processing circuitry 15 is configured to determine the weight with respect to each of the pixels regarding the second difference, in accordance with the magnitude of the shift amounts in the tentative shift map. In other words, the shift map generating function 155 is configured to multiply the second difference in Expression (1) by the weights corresponding to the magnitude of the shift amounts in the most up-to-date tentative shift map. A region having a large shift amount in the tentative shift map corresponds to a region estimated to have a strong distortion in the optimization problem, in a pre-correction grid of at least one of the forward MR image and the backward MR image.

The weights are set in such a manner that a pixel value having a larger shift amount has a smaller weight, whereas a pixel value having a smaller shift amount has a larger weight. More specifically, when the iterative calculation related to the optimization of the cost function is performed, the shift map generating function 155 is configured to set the weights in such a manner that a weight related to a region where the shift amount in the tentative shift map tentatively generated in the iterative calculation exceeds a predetermine threshold value is smaller than a weight related to a region where the shift amount is equal to or smaller than the predetermined threshold value. In an example, the values of the weights corresponding to the shift amounts may be set in advance by using a correspondence table.

In the correcting process in the present application example, during the time period from steps S405 through S407, the shift map generating function 155 is configured to determine the weight to be multiplied with respect to each of the plurality of pixels regarding the second difference, on the basis of the tentative shift map and the predetermined threshold value. Further, in the present application example, at step S408, the third term in Expression (1) is calculated by using the determined weights. Because the other processes in the correcting process are the same as those in the embodiment, explanations thereof will be omitted.

In the image processing apparatus 1 and the MRI apparatus 100 according to the first application example of the embodiment described above, the cost function includes the weight to be multiplied in accordance with the shift amount with respect to each of the pixels regarding the second difference. For example, when the optimization of the cost function is performed multiple times, the image processing apparatus 1 and the MRI apparatus 100 according to the first application example are configured to set the weights in such a manner that a weight related to the region where the shift amount in the tentative shift map tentatively generated in each time of optimization of the cost function exceeds the predetermined threshold value is smaller than a weight related to the region where the shift amount is equal to or smaller than the predetermined threshold value. With this configuration, the image processing apparatus 1 and the MRI apparatus 100 according to the first application example are able to set smaller weights for locations having larger shift amounts and is thus able to further enhance the advantageous effects of the embodiments. Because the other advantageous effects are the same as those of the embodiment, explanations thereof will be omitted.

Second Application Example

In the present application example, with respect to certain pixel values larger than a threshold value among the plurality of pixel values regarding the first difference, the cost function places higher importance on the second sum of squared errors than on the first sum of squared errors. For example, in the present application example, when the difference in the total sum of the plurality of pixel values along the phase encoding directions between the two magnetic resonance images exceeds a predetermined threshold value, the weights to be multiplied by the second difference are set in such a manner that a weight related to the region where the threshold value is exceeded is larger than a weight related to the region along the phase encoding directions where the difference in the total sum is equal to or smaller than the threshold value.

More specifically, by employing the shift map generating function 155, the processing circuitry 15 is configured to calculate, with respect to each of the lines (hereinafter, "phase encoding lines") in the phase encoding directions, a sum (hereinafter, "forward sum") of the plurality of pixel values in the forward MR image and a sum (hereinafter, "backward sum") of the plurality of pixel values in the backward MR image. Subsequently, with respect to each of the phase encoding lines, the shift map generating function 155 is configured to calculate a relative error between the forward sum and the backward sum. The relative error is, for example, a value obtained by dividing the absolute value of the difference between the forward sum and the backward sum by the forward sum.

The shift map generating function 155 is configured to compare the relative errors with a threshold value and to identify phase encoding lines related to the relative errors exceeding the threshold value. The shift map generating function 155 is configured to set the weights in such a manner that a weight related to the identified phase encoding lines (hereinafter, "identified lines") is larger than a weight related to the other encoding lines different from the identified lines. In other words, the shift map generating function 155 is configured to set the weights in such a manner that, when the difference in the total sum of the plurality of pixel values along the phase encoding directions between the two magnetic resonance image exceeds the predetermined threshold value, the weight related to the region where the threshold value is exceeded is larger than the weight related to the region along the phase encoding directions where the difference in the total sum is equal to or smaller than the threshold value. The shift map generating function 155 is configured to multiply the second difference by the set weights.

Figure 6:
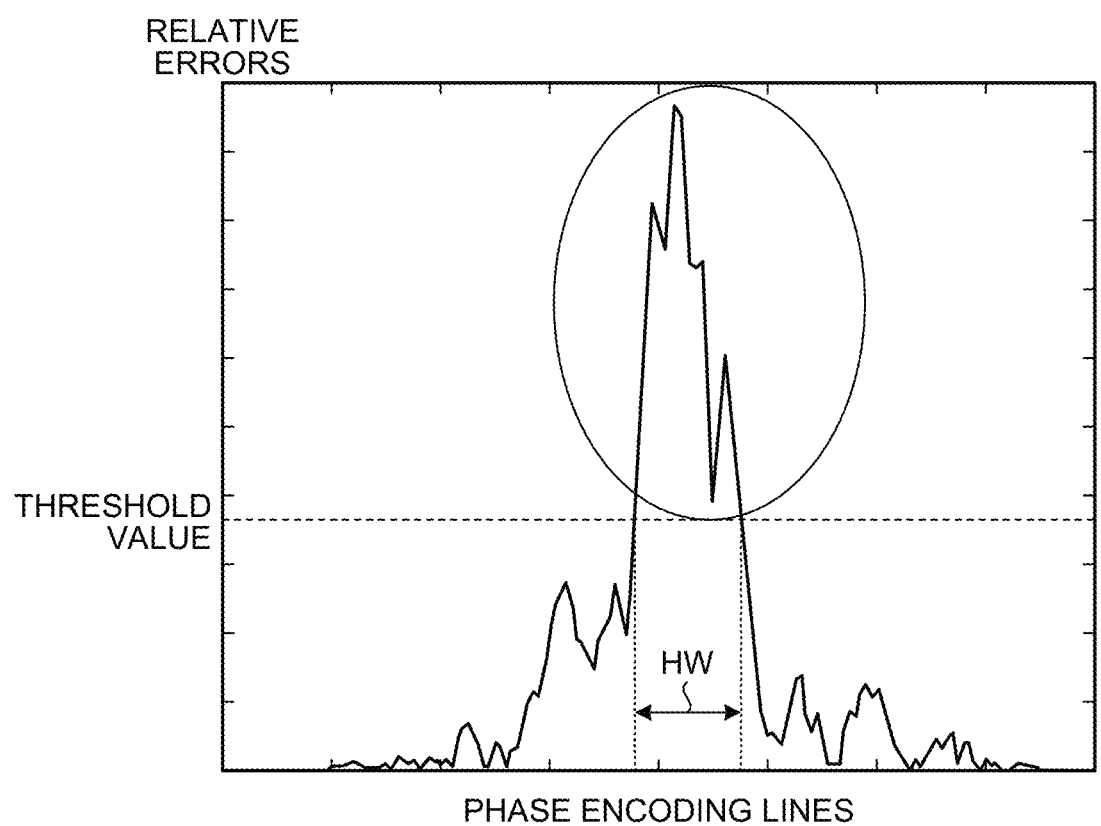
FIG. 6 is a drawing according to a second application example of the embodiment illustrating an example of a distribution of relative errors in relation to phase encoding lines and a threshold value.

FIG. 6 is a drawing illustrating an example of a distribution of the relative errors in relation to the phase encoding lines and the threshold value. As illustrated in FIG. 6, the shift map generating function 155 is configured to set, for a plurality of phase encoding lines HW related to the relative errors exceeding the threshold value, a weight larger than a weight to be applied to the other phase encoding lines. With this configuration, in the cost function, the pixel values regarding the second difference with respect to the pixels related to the identified lines make a larger contribution to the cost value. In other words, in the cost function, among the costs derived from differences in the edge images, higher importance is placed on the cost related to the identified lines.

Further, when EPI images have been taken with respect to a plurality of slices, the shift map generating function 155 may be configured to calculate a relative error with respect to each of the plurality of slices, so as to set the weights as described in the present application example with respect to certain slices related to the relative errors exceeding a threshold value.

FIG. 7 is a drawing illustrating an example of a distribution of relative errors in relation to slice numbers and a threshold value. As illustrated in FIG. 7, the relative errors related to slice numbers 1, 11, and 29 exceed the threshold value. Accordingly, with respect to slice numbers 1, 11, and 29, the shift map generating function 155 is configured to perform the abovementioned process related to setting the weights.

Further, possible embodiments of the settings of the weights to be multiplied with respect to each of the pixels regarding the second difference are not limited to the example described above. For instance, the shift map generating function 155 may be configured to set the weights in such a manner that a weight corresponding to a region where the sum of squared errors is larger than a threshold value A while the difference in the total sum is larger than a threshold value C is larger than a weight corresponding to the other regions, with respect to a region set with a being a predetermined value ($x-\alpha \leq x \leq x+\alpha$, $y-\alpha \leq y \leq y+\alpha$; hereinafter, "set region") between the two images, namely, the forward MR image and the backward MR image in which the positions have been corrected by using the tentative shift map.

In other words, with respect to the set region of the forward MR image and the backward MR image in which the positions have been corrected, when there is a large distortion defined by the threshold value A, while there is a large difference in the pixel value defined by the threshold value C, the shift map generating function 155 is configured to set the weight thereof larger than the weight of the other regions. With this configuration, in the cost function, with respect to the region having a larger distortion while having a larger difference in the MR signal, the second difference makes a larger contribution to the cost function.

Although the example was explained above in which the sum of squared errors and the difference in the total sum with respect to the set region are used as the conditions related to setting the weights; however, possible embodiments are not limited to this example. In other words, with respect to the set region, the shift map generating function 155 may be configured to set the weights in such a manner that a weight corresponding to a region where the sum of squared errors is larger than the threshold value A or where the difference in the total sum is larger than the threshold value C is larger than weights corresponding to the other regions.

In the correcting process according to the present application example, during the time period from steps S405 through S409, the shift map generating function 155 is configured to determine the weight to be multiplied with respect to each of the regions regarding the second difference, on the basis of the forward MR image and the backward MR image in which the positions have been corrected by using the tentative shift map, as well as the threshold value A and/or the threshold value C. Further, in the present modification example, the third term in Expression (1) is calculated at step S409, by using the determined weights. Because the other processes in the correcting process are the same as those in the embodiment, explanations thereof will be omitted.

In addition, although the example was explained above in which the sum of squared errors and the difference in the total sum are calculated on the basis of the forward MR image and the backward MR image in which the positions have been corrected by using the tentative shift map; however, because there is no tentative shift map when the iteration number of times is 0, i.e., when the optimization problem at the first stage is to be solved, it is also acceptable to calculate a sum of squared errors and the difference in the total sum, by using the forward MR image and the backward MR image obtained by the obtaining function 151.

In that situation, the shift map generating function 155 is configured to determine the weight to be multiplied with respect to each of the plurality of regions regarding the second difference, on the basis of the forward MR image and the backward MR image, as well as the threshold value A and/or the threshold value C, at a stage preceding or following step S404. Accordingly, when the iterative calculation is performed in relation to the optimization of the cost function, the shift map generating function 155 is configured to set the weights on the basis of at least one of the following: the difference in the total sum based on two magnetic resonance images obtained by carrying out the position correction on the two magnetic resonance images, while using the tentative shift map tentatively generated in the iterative calculation; and the difference in the total sum in the region set in advance within the two magnetic resonance images.

Although the example was explained above in which the weights to be multiplied by the difference (the second difference) between the forward edge image and the backward edge image are adjusted (e.g., To the region having a larger difference between the forward edge image and the backward edge image, a larger weight is applied compared to the weights applied to the other regions), possible embodiments are not limited to this example. For instance, the shift map generating function 155 may be configured to set the weights in such a manner that, compared to the weights applied to the other regions, a smaller weight is applied to pixel values corresponding to a region determined to have a larger weight according to the abovementioned judgment with regard to the difference (the first difference) between the forward MR image and the backward MR image. In other words, the shift map generating function 155 may be configured to set the weights so as to place higher importance on the second difference than on the first difference in the cost function, with respect to the region having a larger difference between the forward edge image and the backward edge image.

As explained above, the image processing apparatus 1 and the MRI apparatus 100 according to the second application example of the embodiment are configured set the weights in such a manner that, when the difference in the total sum of the plurality of pixel values along the phase encoding directions in the two magnetic resonance images exceeds the predetermined threshold value, the weight related to the region where the threshold value is exceeded is larger than the weight related to the region along the phase encoding directions where the difference in the total sum is equal to or smaller than the threshold value. For example, when performing the iterative calculation related to the optimization of the cost function, the image processing apparatus 1 and the MRI apparatus 100 according to the second application example are configured to set the weights on the basis at least one of the following: the difference in the total sum based on the two magnetic resonance images obtained by carrying out the position correction on the two magnetic resonance images, while using the tentative shift map tentatively generated in the iterative calculation; and the difference in the total sum in the region set in advance within the two magnetic resonance images.

The image processing apparatus 1 and the MRI apparatus 100 according to the second application example are able to achieve the same advantageous effects as those achieved by the brightness correction in the embodiment. For example, in the situation where the forward MR image and the backward MR image have, due to CSF and/or a blood flow, a region where brightness values are different, to begin with, because of imaging timing, it is possible, by applying the weight to such a region, to implement the optimization problem, while placing higher importance on the second difference between the forward edge image and the backward edge image than on the first difference between the forward MR image and the backward MR image.

As explained above, the image processing apparatus 1 and the MRI apparatus 100 according to the second application example are able to generate the shift map having high precision in the correction, even when the forward MR image and the backward MR image have a brightness value difference that is not caused by distortions. It is therefore possible to generate a correction image in which the image distortions (the artifacts) occurring along the phase encoding directions are reduced, while the anatomical structures are maintained. Because the other advantageous effects are the same as those of the embodiment and the first application example, explanations thereof will be omitted.

Third Application Example

In the present application example, regarding the correcting process described in the embodiment, the various types of processes at steps S404 through S407 using the tentative shift map are carried out while the optimization problem OPP is solved. For example, by employing the pre-processing function 153, the processing circuitry 15 is configured to generate edge images (a forward edge image $E_{30}$ and a backward edge image $E_{-}$) by correcting distortions of the two magnetic resonance images (the forward MR image and the backward MR image) while using the shift map generated in the course of the processing of the optimization process OPP.

Figure 8:
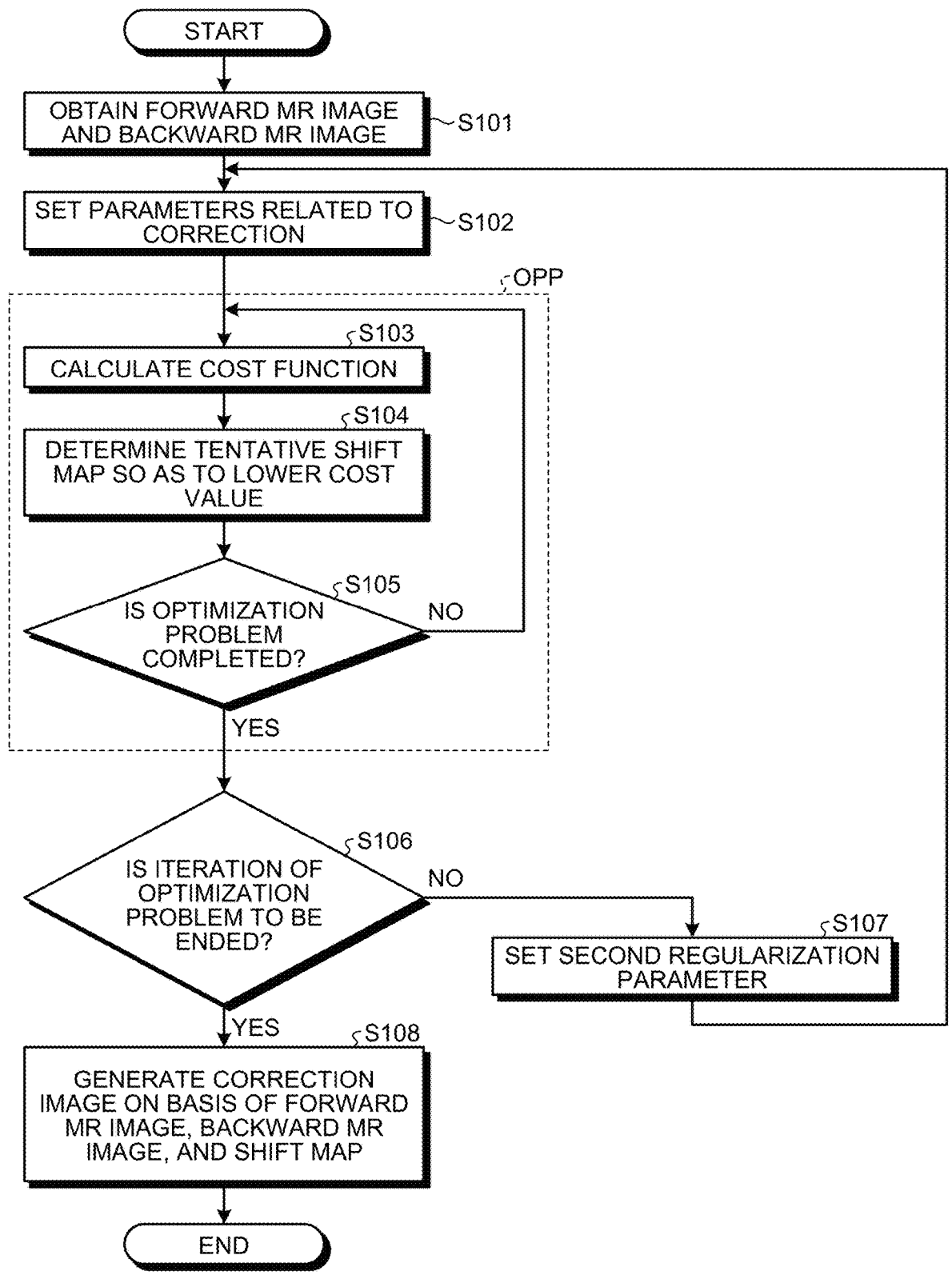
FIG. 8 is a flowchart illustrating an example of a procedure in a correcting process according to a third application example of the embodiment.

FIG. 8 is a flowchart illustrating an example of a procedure in the correcting process according to the present application example. Before the correcting process illustrated in FIG. 8 is performed, the imaging controlling circuitry 121 carries out, on the patient P, two EPI processes corresponding to the two phase encoding directions opposite to each other. As a result of carrying out the two EPI processes, the imaging controlling circuitry 121 acquires the forward MR data and the backward MR data. Subsequently, by employing the image generating function 157, the processing circuitry 15 generates the forward MR image and the backward MR image. The memory 13 stores therein the generated forward MR image and backward MR image.

Because steps S101, S102, S105, S106, and S108 in FIG. 8 correspond to steps S401, S402, S409, S410, and S411 in FIG. 4 respectively, explanations thereof will be omitted. Further, at step S103 in FIG. 8, the processes at steps S404 through S407 (i.e., the process of correcting the distortions of the two magnetic resonance images (the forward MR image and the backward MR image)) are performed in addition to the process at step S408 in FIG. 4. Accordingly, because the content of the process at step S103 includes steps S404 to S408, explanations thereof will be omitted.

Correcting Process
Step S104:

By employing the shift map generating function 155, the processing circuitry 15 determines a tentative shift map so as to lower the cost value in the cost function. Because it is possible to apply a known method to the calculation of the optimization problem at step S104, explanations thereof will be omitted.

Step S107:

When the judgment result at step S106 is "No", the processing circuitry 15 sets, by employing the shift map generating function 155, the second regularization parameter $\lambda_2$ in the cost function, for example, so as to be larger than the value of the second regularization parameter used in the immediately preceding optimization process. In the situation where the second regularization parameter $\lambda_2$ is set to be a fixed value at step S102, the present step is unnecessary. In another example, the shift map generating function 155 may set the second regularization parameter $\lambda_2$ in accordance with a decreasing rate of the second difference.

For example, in the situation where the second difference corresponding to the difference between the edge images has not decreased by a gap larger than a predetermined value over the course of an n-th optimization process to an (n+1)-th optimization process, the processing circuitry 15 increases, while employing the shift map generating function 155, the second regularization parameter $\lambda_2$ in the upcoming optimization process, because it is necessary to lower the cost derived from the second difference in the cost function. In that situation, higher importance is placed on the second sum of squared errors (the errors between the edge images) in the cost function than on the first sum of squared errors (the errors between the two images). In contrast, in the situation where the second sum of squared errors (the errors between the edge images) has sufficiently decreased, but the first sum of squared errors (the errors between the two images) has not sufficiently decreased over the course of the n-th optimization process to the (n+1)-th optimization process, one selected from between the following will be performed in the upcoming optimization process: decreasing the second regularization parameter $\lambda_2$; or increasing the regularization parameter to be multiplied by the first sum of squared errors (the errors between the two images).

The image processing apparatus 1 and the MRI apparatus 100 according to the third application example of the embodiment described above are configured to generate the edge images by correcting the distortions of the two magnetic resonance images, while using the shift map generated in the course of the optimization process of the cost function. In that situation, the image processing apparatus 1 and the MRI apparatus 100 according to the third application example are able to adjust either the regularization parameter to be multiplied by the first sum of squared errors or the second regularization parameter 22 to be multiplied by the second sum of squared errors, in accordance with the decreasing degree of the cost of the first sum of squared errors based on the first difference between the forward MR image and the backward MR image and the decreasing degree of the second sum of squared errors based on the second difference between the forward edge image and the backward edge image.

As a result, the image processing apparatus 1 and the MRI apparatus 100 according to the third application example are able to generate the shift map having high precision in the correction, even when the forward MR image and the backward MR image have a brightness value difference that is not caused by distortions (i.e., that is caused by CSF or blood). It is therefore possible to generate a correction image in which the image distortions (the artifacts) occurring along the phase encoding directions are reduced, while the anatomical structures are maintained. Because the other advantageous effects are the same as those of the embodiment and the first application example, explanations thereof will be omitted.

The embodiment and the first to the third application examples may each be realized alone, as appropriate. Further, any of the embodiment and the first to the third application examples may be realized in combination, as appropriate. The combination of the embodiment and the first to the third application examples may be selected arbitrarily.

When technical concept of the embodiment is realized as an image processing method, the image processing method includes: obtaining two magnetic resonance images corresponding to two phase encoding directions opposite to each other; generating a shift map related to shifting a plurality of pixels in the two magnetic resonance images, by optimizing a cost function using a first difference between the two magnetic resonance images and a second difference between two edge images generated on the basis of the two magnetic resonance images; and generating a correction image obtained by correcting distortions of the two magnetic resonance images on the basis of the two magnetic resonance images and the shift map. Further, in the image processing method, when the optimization of the cost function is performed multiple times, the edge images may be generated, by correcting brightness of the two magnetic resonance images while using a tentative shift map tentatively generated during an iteration of the optimization. Further, in the image processing method, the cost function may further include a weight to be multiplied in accordance with an amount of the shift, with respect to each of the pixels regarding the second difference, and when the optimization of the cost function is performed multiple times, the weights may be set in the image processing method in such a manner that a weight related to a region where the shift amount in a tentative shift map tentatively generated at each time of optimization exceeds a predetermined threshold value is smaller than a weight related to a region where the shift amount is equal to or smaller than the predetermined threshold value. Because procedures and advantageous effects of the correcting process related to the present image processing method are the same as those described in the embodiment and the first to the third application examples, explanations thereof will be omitted.

When technical concept of the embodiment is realized as an image processing program, the image processing program causes a computer to realize: obtaining two magnetic resonance images corresponding to two phase encoding directions opposite to each other; generating a shift map related to shifting a plurality of pixels in the two magnetic resonance images, by optimizing a cost function using a first difference between the two magnetic resonance images and a second difference between two edge images generated on the basis of the two magnetic resonance images; and generating a correction image obtained by correcting distortions of the two magnetic resonance images on the basis of the two magnetic resonance images and the shift map. Further, the image processing program may further cause the computer to realize: when the optimization of the cost function is performed multiple times, generating the edge images, by correcting brightness of the two magnetic resonance images while using a tentative shift map tentatively generated during the iteration of the optimization. Further, the cost function in the image processing program may further include a weight to be multiplied in accordance with an amount of the shift, with respect to each of the pixels regarding the second difference, and the image processing program may further cause the computer realize: when the optimization of the cost function is performed multiple times, setting weights in such a manner that a weight related to a region where the shift amount in a tentative shift map tentatively generated at each time of optimization exceeds a predetermined threshold value is smaller than a weight related to a region where the shift amount is equal to or smaller than the predetermined threshold value.

For example, it is also possible to realize the correcting process by installing the image processing program in a computer of a modality such as the MRI apparatus 100, a PACS server, or any of various types of image processing servers and further loading the program into a memory. In that situation, the program capable of causing a computer to implement the method may be distributed as being stored in a storage medium such as a magnetic disk (e.g., a hard disk), an optical disc (e.g., a CD-ROM, a DVD), or a semiconductor memory. Because procedures and advantageous effects of the correcting process realized by the image processing program are the same as those described in the embodiment and the first to the third application examples, explanations thereof will be omitted.

According to at least one aspect of the embodiments and the like explained above, it is possible to reduce the artifacts that may occur in association with drastic changes of the phases.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus, comprising:
processing circuitry configured to:
    obtain two magnetic resonance images corresponding to two phase encoding directions opposite to each other;
    generate a shift map related to shifting a plurality of pixels in the two magnetic resonance images, by optimizing a cost function using a first difference between the two magnetic resonance images and a second difference between two edge images generated based on the two magnetic resonance images;
    generate a correction image obtained by correcting distortions of the two magnetic resonance images based on the two magnetic resonance images and the shift map; and
    display the generated correction image.

2. The image processing apparatus according to claim 1, wherein
the cost function further includes a regularization parameter to be multiplied by the second difference, and
when performing the optimization of the cost function multiple times, the processing circuitry is further configured to increase a value of the regularization parameter in accordance with how many times the optimization is iterated.

3. The image processing apparatus according to claim 2, wherein the processing circuitry is further configured to perform one of the following: generating the edge images by using a tentative shift map tentatively generated during iteration of the optimization; and generating the edge images by correcting the distortions of the two magnetic resonance images while using the shift map generated in a course of processing of the optimization.

4. The image processing apparatus according to claim 3, wherein the processing circuitry is further configured to generate the edge images, by performing a brightness correction using the tentative shift map, on the two magnetic resonance images.

5. The image processing apparatus according to claim 1, wherein the cost function optimized by the processing circuitry includes a weight to be multiplied in accordance with an amount of the shift, with respect to each of the pixels regarding the second difference.

6. The image processing apparatus according to claim 5, wherein, when performing the optimization of the cost function multiple times, the processing circuitry is further configured to set the weights in such a manner that a weight related to a region where the shift amount in a tentative shift map tentatively generated at each time of optimization exceeds a predetermined threshold value is smaller than a weight related to a region where the shift amount is equal to or smaller than the predetermined threshold value.

7. The image processing apparatus according to claim 5, wherein, when a difference in a total sum of a plurality of pixel values along the phase encoding directions between the two magnetic resonance images exceeds a predetermined threshold value, the processing circuitry is further configured to set the weights in such a manner that a weight related to a region where the threshold value is exceeded is larger than a weight related to a region along the phase encoding directions where the difference in the total sum is equal to or smaller than the threshold value.

8. The image processing apparatus according to claim 7, wherein, when performing an iterative calculation related to the optimization of the cost function, the processing circuitry is further configured to set the weights based on at least one of the following:

the difference in the total sum based on two magnetic resonance images obtained by performing a position correction on the two magnetic resonance images, while using a tentative shift map tentatively generated in the iterative calculation; and the difference in the total sum in a region set in advance within the two magnetic resonance images.

9. An image processing method, comprising:

obtaining two magnetic resonance images corresponding to two phase encoding directions opposite to each other;

generating a shift map related to shifting a plurality of pixels in the two magnetic resonance images, by optimizing a cost function using a first difference between the two magnetic resonance images and a second difference between two edge images generated based on the two magnetic resonance images;

generating a correction image obtained by correcting distortions of the two magnetic resonance images based on the two magnetic resonance images and the shift map; and displaying the generated correction image.

10. The image processing method according to claim 9, wherein, when the optimization of the cost function is performed multiple times, the edge images are generated, by correcting a brightness of the two magnetic resonance images while using a tentative shift map tentatively generated during an iteration of the optimization.

11. The image processing method according to claim 9, wherein the cost function further includes a weight to be multiplied in accordance with an amount of a shift, with respect to each of the pixels regarding the second difference, and when the optimization of the cost function is performed multiple times, the weights are set in such a manner that a weight related to a region where the shift amount in a tentative shift map tentatively generated at each time of optimization exceeds a predetermined threshold value is smaller than a weight related to a region where the shift amount is equal to or smaller than the predetermined threshold value.

12. A non-volatile computer-readable storage medium storing therein an image processing program that causes a computer to perform:

obtaining two magnetic resonance images corresponding to two phase encoding directions opposite to each other;

generating a shift map related to shifting a plurality of pixels in the two magnetic resonance images, by optimizing a cost function using a first difference between the two magnetic resonance images and a second difference between two edge images generated based on the two magnetic resonance images; and generating a correction image obtained by correcting distortions of the two magnetic resonance images based on the two magnetic resonance images and the shift map.

13. The non-volatile computer-readable storage medium storing therein the image processing program according to claim 12, wherein, the computer is further caused to perform: when the optimization of the cost function is performed multiple times, generating the edge images by correcting a brightness of the two magnetic resonance images while using a tentative shift map tentatively generated during an iteration of the optimization.

14. The non-volatile computer-readable storage medium storing therein the image processing program according to claim 12, wherein the cost function further includes a weight to be multiplied in accordance with an amount of the shift, with respect to each of the pixels regarding the second difference, and the computer is further caused to perform: when the optimization of the cost function is performed multiple times, setting weights in such a manner that a weight related to a region where the shift amount in a tentative shift map tentatively generated at each time of optimization exceeds a predetermined threshold value is smaller than a weight related to a region where the shift amount is equal to or smaller than the predetermined threshold value.

\* \* \* \* \*